(12) United States Patent
Albanna et al.

(10) Patent No.: US 10,340,724 B2
(45) Date of Patent: Jul. 2, 2019

(54) INDUCTIVE AND CONDUCTIVE ONBOARD CHARGING SYSTEMS

(71) Applicant: GM GLOBAL TECHNOLOGY OPERATIONS LLC, Detroit, MI (US)

(72) Inventors: Ahmad Albanna, Dearborn Heights, MI (US); Mohammad N. Anwar, Van Buren Township, MI (US); Stephen M. Cichy, Lapeer, MI (US); Andrew J. Namou, West Bloomfield, MI (US)

(73) Assignee: GM GLOVAL TECHNOLOGY OPERATIONS LLC, Detroit, MI (US)

( * ) Notice: Subject to any disclaimer, the term of this patent is extended or adjusted under 35 U.S.C. 154(b) by 255 days.

(21) Appl. No.: 15/479,177

(22) Filed: Apr. 4, 2017

(65) Prior Publication Data
US 2018/0281608 A1    Oct. 4, 2018

(51) Int. Cl.
| H02J 7/02 | (2016.01) |
| H02J 7/06 | (2006.01) |
| H02J 7/10 | (2006.01) |
| B60L 53/12 | (2019.01) |
| B60L 53/14 | (2019.01) |
| B60L 53/22 | (2019.01) |

(52) U.S. Cl.
CPC .............. *H02J 7/025* (2013.01); *B60L 53/12* (2019.02); *B60L 53/14* (2019.02); *B60L 53/22* (2019.02); *H02J 7/06* (2013.01); *H02J 2007/10* (2013.01); *Y02T 10/7005* (2013.01); *Y02T 10/7241* (2013.01)

(58) Field of Classification Search
CPC ..... B60L 11/1812; B60L 11/1816; H02J 7/06; H02J 2007/10; H02J 7/025; Y02T 10/7241; Y02T 10/7005
See application file for complete search history.

(56) References Cited

U.S. PATENT DOCUMENTS

| 2013/0314039 A1* | 11/2013 | Weber | B60L 11/1816 320/109 |
| 2014/0062394 A1* | 3/2014 | Khan | B60L 11/1812 320/108 |
| 2016/0016479 A1* | 1/2016 | Khaligh | B60L 11/1812 363/17 |
| 2017/0036555 A1 | 2/2017 | Albanna et al. | |

* cited by examiner

*Primary Examiner* — Jared Fureman
*Assistant Examiner* — Duc M Pham
(74) *Attorney, Agent, or Firm* — Lorenz & Kopf LLP (57) ABSTRACT

An onboard charging system for charging from a power source may include an energy storage system. A connector may be configured to couple the onboard charging system with the power source. A charging circuit may be electrically connected between the connector and the energy storage system. A converter may be electrically connected in the charging circuit between the connector and the energy storage system. A rectifier may be electrically connected in the charging circuit between the connector and the converter. Output of an inductive receiver may be electrically connected with the charging circuit between the connector and the converter. The converter may control the delivery of voltage and current to the energy storage system from the power source and from the inductive receiver.

19 Claims, 4 Drawing Sheets

INDUCTIVE AND CONDUCTIVE ONBOARD CHARGING SYSTEMS

INTRODUCTION

The present invention generally relates to charging systems, and more particularly relates to inductive and conductive onboard charging systems.

When an energy storage system (ESS), such as a battery system, is used in mobile applications, a convenient approach to reversing the depletion of the ESS is needed. The depleted ESS, or the rechargeable part thereof, may be physically exchanged with a charged unit. Exchange requires availability of compatible battery packs and a system designed to accommodate exchange. Using this option may be logistically challenging for more complex systems. Another option may involve the use of an offboard system where the principle components of the charger are offboard. This type of approach may use charging stations or other types of charging facilities. An offboard charging system requires connection with componentry on the mobile unit, and therefore compatibility is required. Another option may be an onboard system where the principle components of the charging system are carried with the mobile unit. With onboard chargers, the principle charger components are part of each individual mobile unit, rather than being located at an offboard station that supplies power through a plug-in connection.

With either onboard or offboard chargers, an available power source and a compatible connection therewith, are needed to effect charging. A physical connection with an offboard source may be employed where a component of the mobile unit is joined with a mating component of a charging facility. In other applications, an onboard generator may be used to supply power. Regardless of the type of system employed, the ability to provide convenient and effective charging is required.

Accordingly, it is desirable to provide improved systems and techniques for charging batteries. It is also desirable to provide methods, systems, and vehicles utilizing such techniques. Furthermore, other desirable features and characteristics of charging systems will be apparent from the subsequent detailed description and the appended claims, taken in conjunction with the accompanying drawings and the foregoing technical field and introduction.

SUMMARY

A number of examples may involve an onboard charging system for charging an ESS from a power source. A coupling device may be configured to couple the onboard charging system with the power source. A charging circuit may be electrically connected between the coupling device and the ESS. A converter may be electrically connected in the charging circuit between the coupling device and the ESS. A rectifier may be electrically connected in the charging circuit between the coupling device and the converter. The output side of an inductive receiver may be electrically connected with the charging circuit between the coupling device and the converter. The converter may control the delivery of voltage and current to the ESS from the power source and from the inductive receiver.

A number of additional examples may involve an onboard charging system for charging from an alternating current (AC), power source. A direct current (DC), ESS may be used. A connector may be configured to couple the onboard charging system with the AC power source. A charging circuit may be electrically connected between the connector and the ESS. A rectifier may be electrically connected in the charging circuit with the connector, the rectifier converting AC to DC. A converter may be electrically connected in the charging circuit between the rectifier and the ESS, and may boost DC voltage. Another converter may be electrically connected in the charging circuit between the first converter and the ESS. An inductive receiver may be provided onboard the vehicle. The inductive receiver may be configured to couple with a source transmitter across an air gap. An output side of the inductive receiver may be electrically connected with the charging circuit.

In a number of other examples, an onboard charging system may be provided for charging a DC ESS from an AC power source. The onboard charging system may be disposed on a vehicle. An electric motor may be configured to propel the vehicle. The ESS may be disposed on the vehicle and may be electrically connected with the electric motor to provide power thereto. A connector on the vehicle may be configured to couple with the AC power source. A conductive charging circuit may be electrically connected between the connector and the ESS. A rectifier may be electrically connected in the conductive charging circuit, and may convert AC to DC. A first converter may be electrically connected in the conductive charging circuit between the rectifier and the ESS. The first converter may boost DC voltage in the conductive charging circuit. A second converter may be electrically connected in the charging circuit between the first converter and the ESS. An inductive receiver may be included onboard the vehicle. The inductive receiver may be configured to couple with a source across an air gap to induce current in the inductive receiver. The inductive receiver may be electrically connected in an inductive charging circuit. The inductive charging circuit may be electrically connected with the conductive charging circuit at a node located between the connector and the second converter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to impart limitations. Furthermore, there is no intention to be bound by any theory presented in the preceding sections, or the following detailed description.

Figure 1:
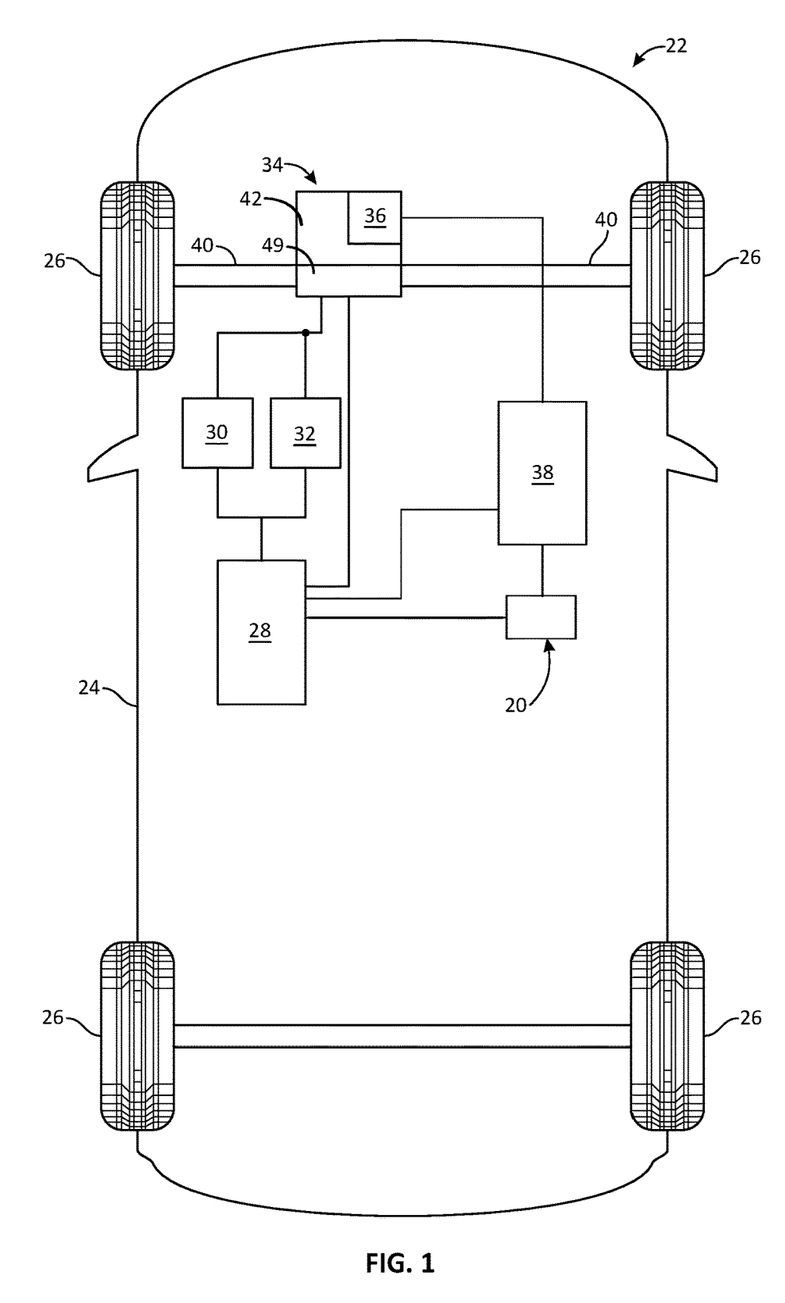
FIG. 1 is a functional block diagram of an electrified vehicle that includes an ESS charging system, in accordance with an exemplary embodiment.

In a number of examples, an ESS charging system 20 may be employed in a power unit, which may be any unit that uses an ESS for which charging may be needed. The power unit may, for example, be a vehicle, a generator, a portable power supply, or any ESS powered equipment whether mobile, portable or stationary. In a number of examples, the power unit may be a vehicle 22, such as indicated in FIG. 1. The vehicle 22 may be any one of a number of different types of land, sea, or air vehicles, and in certain embodiments, may for example, be a passenger automobile of any configuration. As depicted in FIG. 1, the vehicle 22 may include, in addition to the above-referenced ESS charging system 20, any, or any combination of: a body 24, wheels 26, an electronic control system 28, a steering system 30, and a braking system 32. The wheels 26 may each be rotationally coupled to the body 24. In various embodiments the vehicle 22 may differ from that depicted in FIG. 1. For example, in certain embodiments the number of wheels 26 may vary. By way of additional examples, in various embodiments the vehicle 22 may not have wheels 26 that react against a roadway, but may include another method of converting torque into motion, for example, through pitched blades operating against a fluid.

In the examples illustrated in FIG. 1, the vehicle 22 may include at least one propulsion system 34, which in these examples may drive the wheels 26. The propulsion system 34 may include an engine 42 and/or an electric machine, which may include a device such as a motor 36. With inclusion of the motor 36, the vehicle 22 is an electrified vehicle. In a number of examples, the motor 36 may be an electric motor-generator and/or may be more than one motor. The motor 36 may be powered by a power source 38, which may be a rechargeable ESS, and in a number of examples may be a battery or batteries. In a number of examples, the propulsion system 34 may include a combustion engine, such as in a hybrid arrangement with the motor 36, or in another alternative configuration. In a number of examples, the electronic control system 28 may include variations of components or modules that may be packaged together, or distributed to various locations of the vehicle 22. In a number of examples, the electronic control system 28 may include an engine control module, a body control module, a transmission control module, a battery management system, a vehicle integration control module, and/or one or more other components to control a system, function or operation, of the vehicle 22. The propulsion system 34 may be coupled to at least some of the wheels 26 through one or more drive shafts 40. In some examples, the propulsion system 34 may include the engine 42 and/or a transmission 49 to provide variable output. In a number of examples, the motor 36 may be coupled to the transmission 49. In a number of examples, the engine 42 and/or transmission 49 may not be necessary, and may be omitted.

In the examples illustrated in FIG. 1, the steering system 30 may control the direction of at least some of the wheels 26. In certain embodiments, the vehicle 22 may be autonomous, utilizing steering commands that are generated by a processor, such as in the electronic control system 28. The braking system 32 may provide braking for the vehicle 22. The braking system 32 may receive inputs from a driver via a brake pedal (not shown), which may control vehicle deceleration through wheel brakes (not shown). A driver may also provide inputs via an accelerator pedal (not shown) to command a desired speed or acceleration of the vehicle 22. Response of the vehicle 22 to these inputs may be effected, at least in part, through an output speed and/or torque of the motor 36. Similar to the description above regarding possible variations for the vehicle 22, in certain embodiments steering, braking, and/or acceleration may be commanded by a computer instead of by a driver, such as through an autonomous capability.

Figure 2:
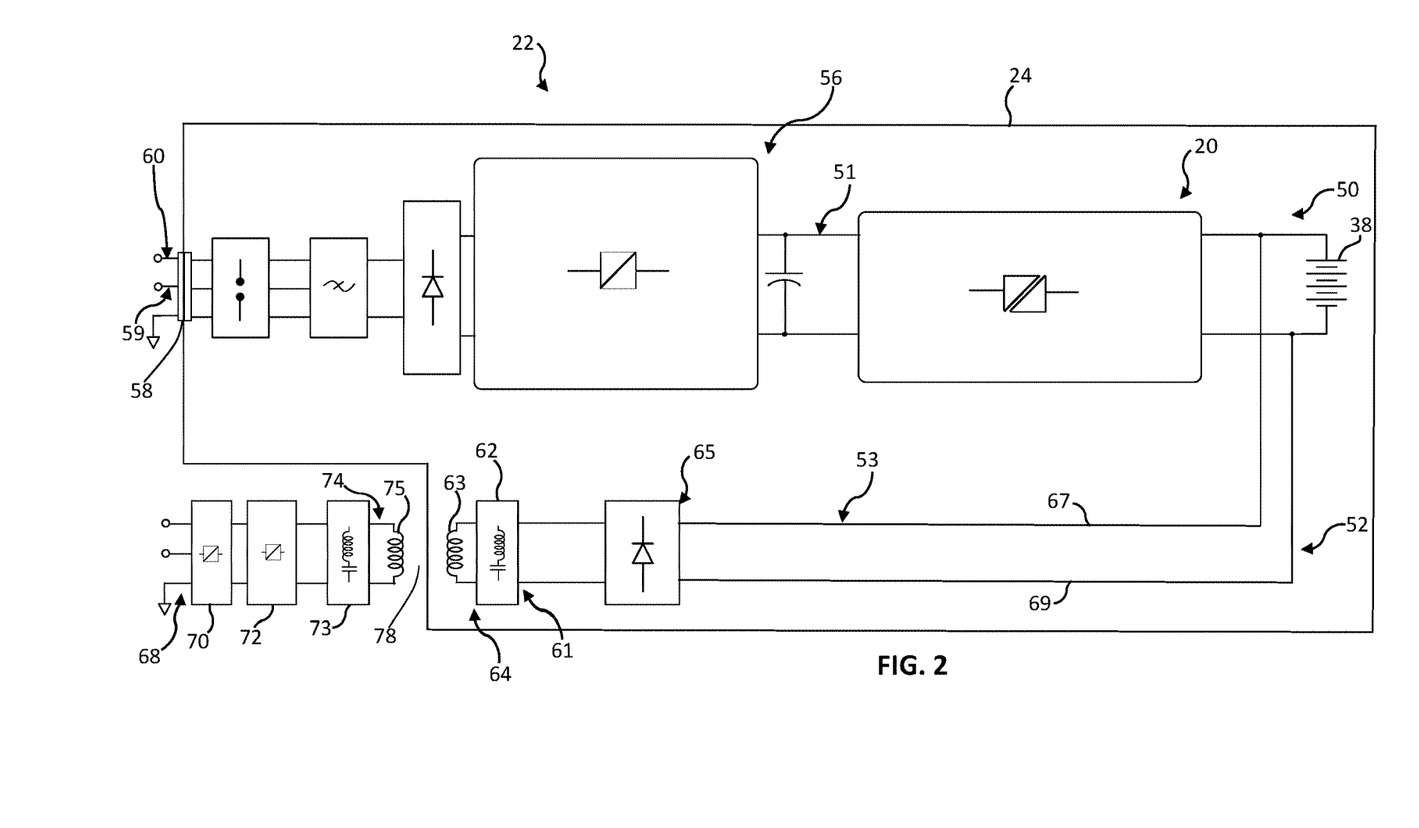
FIG. 2 is a block diagram of ESS charging system aspects shown with the electrified vehicle of FIG. 1, according to a number of exemplary variations.

With reference to FIG. 2, in a number of examples the body 24 of the vehicle 22 may carry a number of components of the ESS charging system 20, which is shown schematically. When on the vehicle 22, the components are referred to as being onboard. The ESS charging system 20 may employ an onboard charging system topology that may be compatible with a variety of charging system variations. In a number of examples, functions of the ESS charging system 20, may be executed in the electronic control system 28 of FIG. 1, which may be electrically coupled with the ESS charging system 20. In other examples, functions of the ESS charging system 20 may be executed in other controllers outside the electronic control system 28

In a number of examples, the ESS charging system 20 may include a conductive charging system 50 that has a conductive charging circuit 51. Conductive charging system 50 may include elements residing onboard the vehicle 22. For example, the conductive charging system 50 may include a power adaptation stage 56. The power adaptation stage may condition, convert, and/or control the power that is received onboard the vehicle 22 from an offboard source. A coupling device such as a charging connector 58 may be connected with the power adaptation stage 56 and may be connectable with a power source 60 for charging purposes. The power adaptation stage 56 may extend from the connection with the power source 60 at charging connector 58 to the ESS 38. The power source 60 may be any compatible power source, and in a number of examples may be part of infrastructure such as a power distribution system, may be a generator unit, or in some examples may be an energy storage system. In other examples, the power source 60 may be a voltage and current source of any number of variations. The charging connector 58 may be coupled with the power source 60, such as through a wired connection that may include conductors 59. The conductors 59 may include a number of line conductors and a protective earth conductor. The vehicle 22 and/or the power source 60 may be provided with a port or connector to provide a releasable connection between the two. In some examples, an extendable cable (not shown) may be fixed to, or otherwise provided with, one of the vehicle 22 or the power source 60 to facilitate connection.

When charging of the ESS 38 is desired, the vehicle 22 and the power source 60 may be brought in proximity with one another to enable connection, such as through the cable. The charging process may include control through the power adaptation stage 56, which for example, may include any, or any combination of: surge protection; filtering; converting between alternating current (AC), and direct current (DC); power factor correction (PFC); and/or DC-DC buck or boost conversion. In a number of examples, charging may be controlled to provide multiple stages with different current and/or voltage modes. System protections such as isolation may be provided through the power adaptation stage 56. Accordingly, in a number of examples the power adaptation stage 56 may provide onboard control of a number of factors in the charging process when power is received through the wired connection with the power source 60 and delivered to the ESS 38.

In a number of examples, the ESS charging system 20 may include an inductive charging system 52 that has an inductive charging circuit 53. As illustrated in FIG. 2, the vehicle 22 may include onboard components of the inductive charging system 52. These may include a receiver 64 that may be configured to deliver current when exposed to a magnetic field as part of an inductive coupling and inductive power transfer process. The receiver 64 may include a receiver coil 63 coupled with receiver electronics 62. The receiver 64 may be connected with, or may include an impedance matching stage as part of the receiver electronics 62. Induced current at the output side 61 of the receiver 64 may be conducted to a rectification stage 65. In a number of examples, the rectification stage 65 may include a rectifier to convert AC to DC. The rectification stage 65 may be passive or active. DC current may be delivered from the rectification stage 65 to the ESS 38 for charging thereof, through conductors 67, 69. The onboard components of the inductive charging system 52 may couple with offboard components. In a number of examples, the offboard components may include a power source 68. The power source may be any compatible power source, such as a generator or distribution system (e.g. grid), connection. Power from the power source 68 may be adapted through an AC-DC converter 70 and a DC-AC converter 72. The adapted power supply may for example, involve conversion of source AC at sixty hertz to AC at high frequency, such as 20-85 Khz. The high frequency AC voltage may be delivered to a transmitter 74, which may include electronic circuit 73 and transmitter coil 75. A magnetic field may be generated by the transmitter coil 75, which may develop a magnetic field in the air gap 78 between the transmitter 74 and the receiver 64 onboard the vehicle 22. In a number of examples, resonant inductive coupling may be employed in the inductive charging system 52 to enhance coupling, such as through wireless resonators with a transmitter-resonator on the offboard side and a receiver-resonator on the onboard side. Accordingly, the ESS 38 may be charged from an offboard source via a wired connection through the conductive charging system 50, or may be charged from an offboard source wirelessly through the inductive charging system 52.

Figure 3:
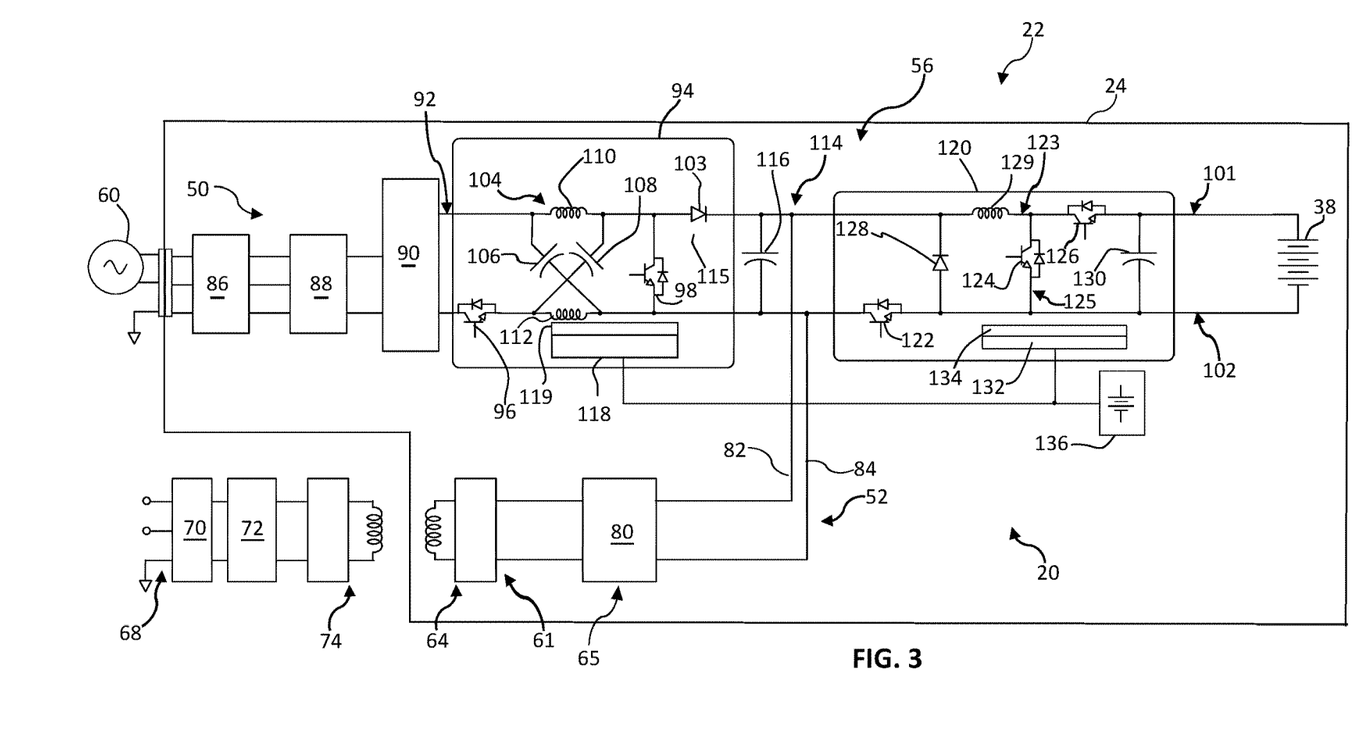
FIG. 3 is a schematic diagram including an ESS charging system shown with the electrified vehicle of FIG. 1, according to a number of exemplary variations.

Referring to FIG. 3, in a number of examples the ESS charging system 20 may include the conductive charging system 50 and the inductive charging system 52. The inductive charging system 52 is configured to deliver output from the rectification stage 65 to the DC bus 92 of the conductive charging system 50. The output may be delivered through conductors 82, 84. Accordingly, when the ESS 38 is charged by the conductive charging system 50 or by the inductive charging system 52, the charging process may be controlled through the adaption stage 56, such as in the converter(s) thereof, as operated by their controller(s). For example, feedback on the state of the ESS 38 may be used to adjust the charging voltage and/or current. In some examples, initial charging may be carried out at constant current. As the battery cell limit is approach, the charging power may be controlled with constant voltage to top off the battery without exceeding depth of charge limits. Current and voltage may be controlled such as by varying the duty cycle of switches in the converter(s). In other examples the power controls may be employed to avoid high temperatures, current, voltage, or other factors for maintaining battery health.

The conductive charging system 50 may include a connection with the power source 60. In some examples, the power source 60 may be of a type normally available in a residence, such as a 120V, or 240V, 60 Hz supply, with ground. The AC voltage may be received onboard the vehicle 22 through a protective device such as a surge protector 86 to provide protection from voltage variation in the supply. The AC voltage may be conducted from the surge protector 86 to a filter 88, which may reduce the transfer of electromagnetic noise. The AC circuit may continue from the filter 88 to a rectifier 90, where the AC voltage may be converted to DC. The rectifier 90 may include any suitable rectifying arrangement such as diodes, silicon-controlled rectifiers (SCRs), or insulated gate bipolar transistors (IGBTs), connected in a bridge configuration. On the opposite side of the rectifier 90 from the filter 88, the DC bus 92 begins. The DC bus 92 includes DC bus rails 101, 102 and may be utilized for charging the ESS 38 from the power source 60.

A converter 94 may be connected in the DC bus 92 adjacent the rectifier 90. The converter 94 may include switches 96 and 98. The switches 96, 98 may include a semiconductor device such as a metal oxide semiconductor field-effect transistor (MOSFET), IGBT, gate turn-off thyristor (GTO), or another electronic switching device as the switching element. The switches 96, 98 may be provided with antiparallel diodes. The switches 96, 98 are controllable for conducting (ON), and blocking (OFF), modes. The switch 96 may be connected in the DC bus rail 102. The switch 98 may be connected between the DC bus rails 101, 102. The converter 94 may include an output diode 103, which may be connected in the DC bus rail 101. The converter 94 may include an inductor-capacitor (LC), network 104 connected with the DC bus rails 101, 102. The LC network 104 is located between the power source 60 and the output diode 103. The LC network 104 may include equal capacitors 106, 108 connected across the DC bus rails 101, 102 diagonally such as in an "X" configuration. The LC network 104 may include equal inductors 110, 112, one connected in each DC bus rail 101, 102. The inductor 110 may be located in the DC bus rail 101 between the connections for the capacitors 106, 108. The inductor 112 may be located in the DC bus rail 102 between the connections for the capacitors 106, 108.

In a number of examples, a DC link capacitor 116 may be connected across the DC bus rails 101, 102 adjacent to the converter 94. The DC link capacitor 116 may be charged from the power source 60 through the converter 94. The converter 94 may be electrically coupled with a controller 118 through a gate driver 119. The controller 118 may be powered by a low voltage source 136. The gate driver 119 may receive a low-power input from the controller 118 and produces a high-current drive input for the gates of the semiconductor devices of switches 96, 98. The controller 118 provides switching control for the converter 94, controlling the switches 96, 98 according to control logic that may be programmed to provide the desired output, and for responses to operation modes, voltage status, and other factors. Operation modes of the LC network 104 may involve a first mode where during switching, a short switched state or shoot-through, may occur. Short-switching between the DC bus rails 101, 102 may be utilized to induce a response in the LC network 104. Resonance may occur between the inductors 110, 112 and the capacitors 106, 108, providing an increased voltage. As voltage peaks occur on a high duty cycle, the output signal may approach a continuous state. While the converter 94 employs the LC network 104, other PFC converter topologies may be employed in the ESS charging system 20. The increased output of the LC network 104 may enable the use of inductors and capacitors that are smaller as compared to other converter topologies. In addition, the LC network 104 may enable the use of a smaller DC link capacitor 116 as compared to other converter topologies. To charge the DC link capacitor 116, a switch 122 in the DC bus rail 102 may be in the OFF state, and the switch 96 may be in the ON state. Energy from the power source 60 charges the DC link capacitor 116 and the ESS 38 is isolated with the switch 122 open. In this state there may be no energy across the DC bus rails 101, 102 to the right (as viewed in FIG. 3), of the DC link capacitor 116. To discharge the DC link capacitor 116 for charging the ESS 38, the switch 122 is switched ON and the switch 96 is set to OFF. With the switch 96 OFF, the capacitors may be isolated from the power source 60, and with the switch 122 ON, the energy of the DC link capacitor 116 is delivered to the ESS 38. The converter 94 max boost the voltage across the DC bus rails 101, 102 to a high level. In one example, the voltage level may be 450 volts at the DC link capacitor 116, it being understood that the amount of boost provided by the converter 94 may be designed to suit the application.

In a number of examples, a second converter 120 may be connected in the DC bus 92 between the DC link capacitor 116 and the ESS 38. The converter 120 may be either a buck or a boost converter depending on the voltage rating of the ESS 38 and the voltage delivered by the converter 94. For example, the converter 120 may be a buck converter, constructed to provide a step down in voltage when the ESS 38 voltage may be lower than the voltage output from the converter 94. Alternatively, the converter 120 may be a boost converter, constructed to provide a step up in voltage when the ESS 38 voltage is higher than the output voltage from the converter 94. In the examples of FIG. 3, the converter 120 is configured to boost voltage when charging the ESS 38. The converter 120 may include a number of switches, 122, 124 and 126. The switches 122, 124, 126 may include a semiconductor device, such as described above in relation to converter 94, as the switching element. The switches 122, 124, 126 may be provided with antiparallel diodes, and max be controllable for ON and OFF states. The switch 122 may be connected in the DC bus rail 102. Accordingly, the switch 122 may be set to the OFF state to disconnect the ESS 38 from the DC link capacitor 116, and the power source 60. The switch 122 may be set to the ON state to provide connection. The switch 124 may be connected between the DC bus rails 101, 102. The switch 126 may be connected in the DC bus rail 101. The converter 120 may include a diode 128, connected between the DC bus rails 101, 102. The converter 120 includes an inductor 129 that may be connected in the DC bus rail 101. The converter 120 include a capacitor 130 connected between the DC bus rails 101, 102. The converter 120 may be coupled with a controller 132 through a gate driver 134. The controller 132 may be powered by a low voltage source 136. The gate driver 134 may receive a low-power input from the controller 132 to produce a high-current drive input for the gates of the semiconductor devices of switches 122, 124, 126. The controller 132 provides switching control for the converter 120, controlling the switches 122, 124, 126 according to control logic that may be programmed to provide the desired output and for responses to operation modes, voltage status, and other factors.

In a number of examples, the converter 120 may include a boost circuit 123. In response to the controller 132, the switch 122 may be set to the ON state and the switch 124 may be set to the OFF state to transfer charge from the DC link capacitor 116 to the ESS 38. The converter 120 may be switched to utilize inductor 129 and capacitor 130 to boost voltage through the converter 120. For example, switch 124 may be placed in the ON state to build energy in the inductor 129. During this stage, charge on the capacitor 130 may supply the ESS 38. The switch 126 may be placed in the OFF state for this action. Alternatively, the switch 124 may be placed in the OFF state to supply charge from the inductor 129 to the ESS 38 and to charge the capacitor 130. The switch 126 may be placed in the ON state during this action. In one example, the voltage level may be increased through the converter 120, from 450V DC to 600V DC at the ESS 38, it being understood that the amount of boost (or buck), provided by the converter 120 may be designed to suit the application. Accordingly, the converter 94 may provide a DC electric power output, using DC link capacitor 116. The converter 120 may use the DC output of the converter 94, including from the DC link capacitor 116, as an input to provide a DC electric power output to charge the ESS 38. Isolation may be provided without a transformer through the switches 96, 122.

In a number of examples, the converter 120 may be bi-directional to provide reduced voltage from the ESS 38 to the DC bus 92, such as at a node 114. When the vehicle 22 is in operation, the ESS charging system 20 may not be in use to charge the ESS 38 from the power source 60, and so may be available for other uses (not shown). For example, the converter 120 may include a buck circuit 125 to operate in step down mode to supply power from the ESS 38 to the node 114. In response to the controller 119, the converter 120 may be switched to reduce voltage as power transfers from the ESS 38. For example, switch 124 may be placed in the OFF state as power is supplied through the rails 101, 102 from the ESS 38. Switch 122 may be ON during this action. The switch 122 may be cycled to the OFF state to interrupt power to the node 114 from the ESS 38, and the switch 124 may be set to the ON state wherein the inductor 129 may freewheel through the diode 128. During this stage, charge on the DC link capacitor 116 may supply the load at node 114. The converter 120 may provide a stepped down DC electric power output and the resulting power available at node 114 is then available for auxiliary use by other systems (not shown).

In a number of examples, the inductive charging system 52 may include connections between the conductors 82, 84 and the DC bus 92. The connections may be located at the node 114. The node 114 may be located between the converter 94 and the converter 120. During inductive charging, power output from the receiver 64 is supplied through a rectifier 80 of the rectification stage 65, and is delivered to the DC bus 92 at node 114. The inductive source power is processed through the converter 120. The converter 120 may be controlled by the controller 132, and through operation of the switches 122, 124, 124, the inductor 130, and the diode 228, controlled power may be delivered to the ESS 38. Routing the inductive charging system 52 through the converter 120 prior to delivery to the ESS 38 enhances inductive charging control, diagnosis and effectiveness. For example, the topology may enable the vehicle's electronic control system 28 of FIG. 1 in coordination with the controller 132, such as through vehicle integration control, to oversee and control charging power (current and/or voltage). Charging power control may be coordinated with the real time needs of the vehicle 22, including those of the ESS 38, and other requirements, for all charging modes. Control of the inductive charging system 52 and the ability to disconnect the wireless system form the ESS 38 may be accomplished through components of the conductive charging system 50, without adding duplicate high voltage components and their cooling systems as separate devices for inductive charging.

Figure 4:
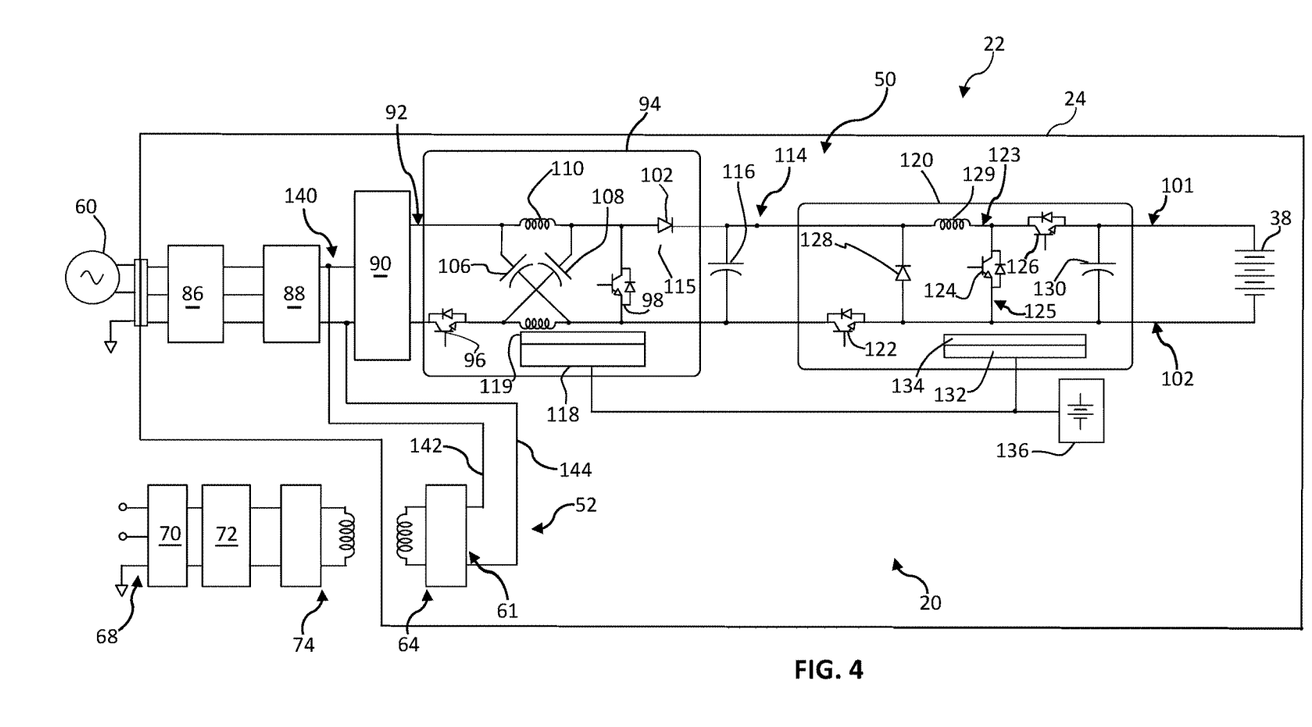
FIG. 4 is a schematic diagram including an ESS charging system shown with the electrified vehicle of FIG. 1, according to a number of exemplary variations.

Referring to FIG. 4, in a number of examples the ESS charging system 20 may include the conductive charging system 50 with the inductive charging system 52, configured to eliminate the need for an output rectifier of the receiver 64. Output from the receiver 64 may be coupled with the AC side of the conductive charging system 50, such as at a connection point of a node 140. Coupling may be effected through conductors 142 and 144. For inductive charging of the ESS 38, the AC voltage output from the receiver 64 may be delivered to the rectifier 90 through the conductors 142, 144. The AC voltage is converted to DC voltage by the rectifier 90 and power supplied there-through, feeds the DC bus 92 of the conductive charging system 50, which in this example, operates as part of the inductive charging system 52. The DC charging voltage may be supplied to the ESS 38 with control provided by both the converters 94 and 120. Power factor correction may be effected in the converter 94. Charge may be transferred to the DC link capacitor 116 and therefrom, to the ESS 38 through the converter 120. Connecting the output side 61 of the receiver 64 with the node 140, avoids the need of a separate rectification device for inductive charging, by utilizing the rectifier 90 to convert the AC voltage to DC voltage. The onboard charger topology offers flexibility and utilization of electrical components of the conductive charging system 50, which may be preexisting, for the inductive charging system 52, thereby enhancing controllability and packaging of the induction charging process and components. The topology may enhance conversion efficiency, such as by using the converter(s) 94, 120 to deliver sine-wave charging. Using the converters 94, 120 for inductive charging may provide wireless charging of the ESS 38 over an expanded range of operating voltages from the transmitter 74. Inductive charging flexibility provided by the ESS charging system 20 supports charging while a vehicle is driven, such as through charging lanes where an electromagnetic field for charging is provided from the roadway.

Through the foregoing examples, mobile application battery systems may be made wireless ready through efficient topologies. Increased power density of onboard charging may be achieved, with increased functionality and enhanced onboard control. While examples have been presented in the foregoing detailed description, it should be appreciated that a vast number of variations exist. It should also be appreciated that details are only examples, and are not intended to limit the disclosure's scope, applicability, or configurations, in any way. Rather, the foregoing detailed description will provide those skilled in the art with a convenient road map for implementing examples of the invention. It being understood that various changes may be made in the function and arrangement of elements described in examples without departing from the scope as set forth in the appended claims.

What is claimed is:

1. An onboard charging system for charging from a power source comprising:
   an energy storage system (ESS);
   a coupling device configured to couple the ESS with the power source;
   a charging circuit electrically connected between the coupling device and the ESS;
   a first converter electrically connected in the charging circuit between the coupling device and the ESS;
   a second converter electrically connected in the charging circuit between the first converter and the ESS, wherein the second converter includes a switching element openable to block current between the power source and the ESS;
   a rectifier electrically connected in the charging circuit between the coupling device and the first converter; and
   an inductive receiver, wherein an output side of the inductive receiver is electrically connected with the charging circuit between the coupling device and the second converter, at least one of the first and second converters controlling the delivery of voltage and current to the ESS from the power source and from the inductive receiver.

2. The onboard charging system of claim 1 comprising:
   a pair of conductors electrically connected between the inductive receiver and the charging circuit; and
   wherein the inductive receiver is configured to couple with a second power source across an air gap.

3. The onboard charging system of claim 1 comprising:
   a pair of conductors electrically connected between the first and second converters; and
   a capacitor connected between the conductors,
   wherein the output side of the inductive receiver is electrically connected with the charging circuit between the capacitor and the second converter.

4. The onboard charging system of claim 3 comprising a pair of conductors electrically connected between the inductive receiver and the charging circuit, the pair of conductors connected with the charging circuit at a node located between the first converter and the second converter.

5. The onboard charging system of claim 3 comprising a pair of conductors electrically connected between the inductive receiver and the charging circuit, the pair of conductors connected with the charging circuit at a node located between the coupling device and the rectifier.

6. The onboard charging system of claim 1 comprising:
   a second rectifier electrically connected with the inductive receiver, wherein an output of the second rectifier is electrically connected with the charging circuit.

7. The onboard charging system of claim 1 wherein:
   the charging circuit comprises a direct current (DC) bus extending from the rectifier to the ESS;
   the first converter comprises a switching element electrically connected with first and second rails of the DC bus;
   the first converter comprises an inductor-capacitor network electrically connected with the DC bus, wherein the inductor-capacitor network has a pair of capacitors, each electrically connected with the DC bus at rail connections and in an X configuration between the first and second rails, and wherein the inductor-capacitor network has a pair of inductors, one connected in series in each of the first and second rails and located between the rail connections of the respective rail for the capacitors; and
   wherein the switching element is electrically connected between the first and second rails to alternatively connect and disconnect the rails through the switching element, which when connected, imparts resonance in the inductor-capacitor network.

8. The onboard charging system of claim 7 wherein the second converter has a second switching element connected in the first rail, a third switching element connected in the second rail, and a fourth switching element connected between the first and second rails.

9. The onboard charging system of claim 1 comprising:
   a vehicle that has a propulsion system;
   an electric motor connected in the propulsion system to provide torque to propel the vehicle; and
   wherein the ESS is electrically connected with the electric motor to provide power thereto; and
   wherein the charging circuit is disposed onboard the vehicle.

10. The onboard charging system of claim 1 comprising:
a vehicle that has a propulsion system;
an electric motor connected in the propulsion system to provide torque to propel the vehicle;
wherein the ESS is electrically connected with the electric motor to provide power thereto; and
wherein the inductive receiver is configured to couple with a second power source located offboard the vehicle.

11. An onboard charging system for charging from an alternating current (AC) power source comprising:
a direct current (DC) energy storage system (ESS);
a connector configured to couple the ESS with the AC power source;
a charging circuit electrically connected between the connector and the ESS;
a rectifier electrically connected in the charging circuit with the connector, the rectifier converting AC to DC;
wherein the charging circuit comprises a DC bus with first and second rails extending from the rectifier to the ESS,
a first converter electrically connected in the charging circuit between the rectifier and the ESS, the first converter configured to boost DC voltage; wherein the first converter comprises an inductor-capacitor network electrically connected with the DC bus, wherein the inductor-capacitor network has a pair of capacitors, each electrically connected with the DC bus at rail connections and connected in an X configuration between the first and second rails, and wherein the inductor-capacitor network has a pair of inductors, one connected in series in each of the first and second rails and located between the rail connections of the respective rail for the capacitors, wherein the first converter comprising a switching element electrically connected between the first and second rails to alternatively connect and disconnect the rails through the switching element, which when connected, imparts resonance in the inductor-capacitor network,
a second converter electrically connected in the charging circuit between the first converter and the ESS;
an output side of the inductive receiver, electrically connected with the charging circuit; and
an inductive receiver onboard the vehicle, wherein the inductive receiver is configured to couple across an air gap with a transmitter source offboard the vehicle.

12. The onboard charging system of claim 11 wherein:
the output side of the inductive receiver is electrically connected with the charging circuit at a node located between the connector and the first converter, the first and second converters controlling the delivery of voltage and current to the battery from the AC power source and from the inductive receiver.

13. The onboard charging system of claim 11 wherein:
the output side of the inductive receiver is electrically connected with the charging circuit at a node located between the first converter and the second converter; and
the second converter controls delivery of a voltage and a current to the battery from the AC power source and from the inductive receiver.

14. The onboard charging system of claim 11 comprising:
a second rectifier electrically connected to the inductive receiver; and
wherein the output side of the inductive receiver is electrically connected with the charging circuit through the second rectifier, the second rectifier converting AC to DC; and
wherein the output side is electrically connected at a node located between the first converter and the second converter, the second converter controlling the delivery of a voltage and a current to the ESS from the AC power source and from the inductive receiver.

15. The onboard charging system of claim 11 wherein:
the first converter comprises a DC to DC voltage boosting circuit.

16. The onboard charging system of claim 15 wherein:
the second converter comprises a DC to DC voltage boosting circuit.

17. The onboard charging system of claim 15 wherein:
the second converter comprises a DC to DC voltage step-down circuit.

18. The onboard charging system of claim 11 wherein:
the second converter comprises a bi-directional DC to DC voltage converting circuit.

19. An onboard charging system for charging from an alternating current (AC), power source comprising:
a direct current (DC) energy storage system (ESS);
a vehicle, wherein the onboard charging system is disposed on the vehicle;
an electric motor configured to propel the vehicle, wherein the ESS is disposed on the vehicle and electrically connected with the electric motor to provide power thereto;
a connector on the vehicle configured to couple with the AC power source;
a conductive charging circuit electrically connected between the connector and the ESS;
a rectifier electrically connected in the conductive charging circuit, the rectifier converting AC to DC;
a first converter electrically connected in the conductive charging circuit between the rectifier and the ESS, the first converter boosting DC voltage in the conductive charging circuit;
a second converter electrically connected in the charging circuit between the first converter and the ESS; wherein the second converter includes a switching element openable to block current between the power source and the ESS;
an inductive receiver onboard the vehicle;
wherein the inductive receiver is configured to couple with an inductive power source across an air gap to induce current in the inductive receiver, the inductive receiver electrically connected in an inductive charging circuit; and
wherein the receiver is electrically connected with the conductive charging circuit at a node located between the connector and the rectifier, wherein the rectifier is configured to rectify incoming power from the receiver and from the AC power source.

* * * * *